(12) United States Patent
Ha

(10) Patent No.: US 8,334,873 B2
(45) Date of Patent: Dec. 18, 2012

(54) METHOD AND APPARATUS OF MANAGING IMAGES STORED IN STORAGE MEDIUM

(75) Inventor: Kwang-soo Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1346 days.

(21) Appl. No.: 11/528,250

(22) Filed: Sep. 28, 2006

(65) Prior Publication Data

US 2007/0019001 A1    Jan. 25, 2007

(30) Foreign Application Priority Data

Dec. 5, 2005 (KR) .......................... 10-2005-0117675

(51) Int. Cl.
*G06F 15/00* (2006.01)
(52) U.S. Cl. ........................................................ 345/501
(58) Field of Classification Search .................... 345/501
See application file for complete search history.

(56) References Cited

U.S. PATENT DOCUMENTS

| 5,307,086 | A | * | 4/1994 | Griffin et al. ................. 715/808 |
| 6,034,683 | A | | 3/2000 | Mansour et al. |
| 6,097,389 | A | * | 8/2000 | Morris et al. ................. 715/804 |
| 6,380,953 | B1 | * | 4/2002 | Mizuno ......................... 715/764 |
| 2004/0125150 | A1 | | 7/2004 | Adcock et al. |
| 2005/0108643 | A1 | | 5/2005 | Schybergson et al. |
| 2005/0138066 | A1 | * | 6/2005 | Finke-Anlauff et al. .. 707/104.1 |
| 2005/0162718 | A1 | | 7/2005 | Kim et al. |
| 2005/0165795 | A1 | * | 7/2005 | Myka et al. ................... 707/100 |
| 2005/0185204 | A1 | | 8/2005 | Shelton et al. |
| 2005/0188326 | A1 | | 8/2005 | Ikeda |
| 2007/0296737 | A1 | | 12/2007 | Park et al. |

FOREIGN PATENT DOCUMENTS

| JP | 2001-215629 | 8/2004 |
| JP | 2005-031830 | 2/2005 |
| KR | 10-2004-0083178 A | 10/2004 |
| KR | 10-2005-0070245 A | 7/2005 |
| KR | 10-2005-0072844 A | 7/2005 |
| KR | 10-2006-0008485 A | 1/2006 |

\* cited by examiner

*Primary Examiner* — Edward Martello
(74) *Attorney, Agent, or Firm* — Roylance, Abrams, Berdo and Goodman, LLP

(57) ABSTRACT

An image management method and apparatus that uses a plurality of time maps to display retrieved images for allowing a user to conveniently and quickly retrieve images. An upper map is displayed with time intervals included on the upper map and divided into first time units, images corresponding to a point in time in which a key is positioned on the map are retrieved, and the retrieved images are displayed. A lower map is displayed with time intervals included on the lower map and divided into second time units, images corresponding to a point in time in which a key is positioned on the map are retrieved, and the retrieved images are displayed. If a user input for any one of the time intervals expressed on the upper map or lower map is received, candidate images corresponding to the input time interval are retrieved and the retrieved images are displayed.

27 Claims, 7 Drawing Sheets

BASIC MAP

MONTHLY-ORIENTED MAP

WEEKLY-ORIENTED MAP

METHOD AND APPARATUS OF MANAGING IMAGES STORED IN STORAGE MEDIUM

CROSS-REFERENCE TO RELATED PATENT APPLICATIONS

This application claims the benefit under 35 U.S.C. §119(a) of Korean Patent Application No. 10-2005-0117675, filed on Dec. 5, 2005, in the Korean Intellectual Property Office, the entire disclosure of which is hereby incorporated by reference.

BACKGROUND OF THE INVENTION

1. Field of the Invention

The present invention relates to a method and an apparatus of managing images stored in a storage medium. More particularly, the present invention relates to an image management method and apparatus for retrieving and displaying images stored in a storage medium mounted on or connected to an image forming apparatus.

2. Description of the Related Art

Generally, an image forming apparatus converts a document, which a user creates using an application program and requests the image forming apparatus to print out, into encoded data and outputs the data on printing paper in a form that can be read by the user. Recently, image forming apparatuses that are directly connected to an external storage medium, such as a memory card or a universal serial bus (USB) memory stick, so that image data input from the external storage medium can be printed or image forming apparatuses having a large-capacity hard disk have been introduced.

When this type of image forming apparatus receives an input of image data from a memory card and prints the image, the image forming apparatus is generally equipped with a display apparatus such as a liquid crystal display (LCD) capable of displaying an image stored in the memory card so that the user can confirm images stored in the memory card and select an image to be printed. Also, a display apparatus attached to the photo printer has an N-up display function for displaying a plurality of images on one screen so that a plurality of images stored in the memory card may be confirmed.

When an image forming apparatus comprises a large capacity hard disk, it is difficult to display images using an LCD display apparatus which is of a limited size because the number of stored images is very high. Accordingly, image retrieval methods enabling grouping and retrieving of images stored in a storage medium with respect to creation time are provided.

FIGS. 1A through 1C illustrate a conventional method of retrieving images stored in a storage medium of an image forming apparatus. According to the conventional method, if a user selects one of a plurality of time intervals formed as tabs, images belonging to the selected time interval are displayed. As illustrated in FIG. 1A, if a tab 100, "Mar '05," indicating March 2005 is selected by the user from tabs indicating respective months, images generated in March 2005 are displayed. As illustrated in FIG. 1B, if a tab 110, "Feb '05," indicating February 2005 is selected by the user, images generated in February 2005 are displayed. As illustrated in FIG. 1C, if one of the displayed images is selected by the user, the selected image is displayed on the entire or a substantial portion of the screen 120.

When images stored in a storage medium are managed using the conventional method as described above, the number of tabs that can be displayed is limited and when the number of tabs increases, management of the images becomes very complicated.

Accordingly, there is a need for an improved system and method for effectively retrieving and displaying images stored in a storage medium of an image forming apparatus.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an image management method and apparatus capable of effectively retrieving and displaying images stored in a storage medium of an image forming apparatus.

According to an aspect of an exemplary embodiment of the present invention, a method of managing images stored in a storage medium is provided. An upper map is displayed with time intervals that are expressed on the upper map and divided into first time units. Images corresponding to a point in time in which a key is positioned on the map are retrieved and the retrieved images are displayed. A lower map is displayed with time intervals that are expressed on the lower map and divided into second time units. Images corresponding to a point in time in which a key is positioned on the map are retrieved and the retrieved images are displayed. If a user input for any one of the time intervals expressed on the upper map or lower map is received, candidate images corresponding to the input time interval are retrieved and the retrieved images are displayed.

In the retrieving of the images, images corresponding to the input time interval may be retrieved from the storage medium by using meta data of the image files stored in the storage medium.

In the displaying of the lower map, if an input from the user to move to the lower map is received, the time interval in which the key is positioned on the upper map may be divided into second time units, and the divided second time units may be displayed.

When the upper map is displayed, if an input from the user to move to the upper map is received, the upper map may be displayed to include a time interval in which the key is positioned on the lower map.

In the displaying of the images, the thumbnails of the images stored in the storage medium may be displayed.

According to another aspect of an exemplary embodiment of the present invention, a method of managing images stored in a storage medium is provided. A monthly-oriented map with time intervals that are expressed on the monthly-oriented map and divided into monthly units is displayed. Images corresponding to a month in which a key is positioned on the monthly-oriented map are retrieved and the retrieved images are displayed. A weekly-oriented map is displayed with time intervals that are expressed on the weekly-oriented map and divided into weekly units. Images corresponding to a week in which a key is positioned on the map are retrieved and the retrieved images are displayed. If a user input for any one of the time intervals expressed on the monthly-oriented map or weekly-oriented map is received, candidate images corresponding to the input time interval are retrieved and the retrieved images are displayed.

Images corresponding to the input time interval may be retrieved in the storage medium by using meta data of the image files stored in the storage medium.

When images which correspond to the month are displayed, representative images of respective weeks belonging to the month may be displayed.

To display the weekly-oriented map, an input is received from a user to move to a weekly-oriented map and a month in which the key is positioned on the monthly-oriented map is divided into time intervals of weekly units and the time intervals of weekly units are displayed.

When the monthly-oriented map is displayed, an input from a user to move to a monthly-oriented map is received and a time interval including the week in which the key is positioned on the weekly-oriented map is displayed in the time interval of monthly units.

In the displaying of the images, the thumbnails of the images stored in the storage medium may be displayed.

The map may be displayed so that a time interval in which an image exists is displayed distinctively from a time interval in which an image does not exist.

In the displaying of the images, the retrieved images may be displayed and changed in each predetermined period.

A basic map in which an entire period of time is divided into time intervals of years and months and the time intervals are displayed. Images corresponding to a point in time in which a key is positioned on the basic map are retrieved from the storage medium and the retrieved images are displayed. In the displaying of the monthly-oriented map, if an input from the user to move to a monthly-oriented map is received, the monthly-oriented map may be displayed to include a point in time in which the key is positioned on the basic map.

An input from the user is received to select any one of the displayed candidate images and to perform a job in relation to the selected image. The input job is performed in relation to the selected image.

According to another aspect of an exemplary embodiment of the present invention, an apparatus for managing images stored in a storage medium is provided. A map building unit displays an upper map expressing time intervals divided into first time units and a lower map expressing time intervals divided into second time units. A user input unit receives an input from a user indicating the position of a key positioned on the map and receives an input from the user of any one of the time intervals expressed on the map. An image retrieval unit retrieves images corresponding to a time interval in which the key is positioned on the map, and images corresponding to a time interval input by the user, from the storage medium. The upper map or the lower map built according to the input of the user is displayed and the retrieved images are displayed.

The first and second time units may be a monthly unit and a weekly unit, respectively.

The image retrieval unit may retrieve the images corresponding to the time interval from the storage medium, by using meta data of the image files stored in the storage medium.

If an input from the user to move to a lower map is received, the map building unit may generate the lower map by dividing a time interval in which the key is positioned on the upper map, into time intervals of the second time units.

If an input from the user to move to an upper map is received, the map building unit may generate the upper map to include a time interval in which the key is positioned on the lower map.

The display unit may display the thumbnails of images stored in the storage medium.

The map building unit may generate a map so that a time interval in which an image exists is displayed distinctively from a time interval in which an image does not exist.

The display unit may display the retrieved images so that the retrieved images are displayed and changed in each predetermined period.

The user input unit may receive an input from the user to select an image on which a job is to be performed, among the displayed candidate images.

According to another aspect of an exemplary embodiment of the present invention, a computer readable recording medium having embodied thereon a computer program for executing the methods is provided.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the descriptions such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1A:
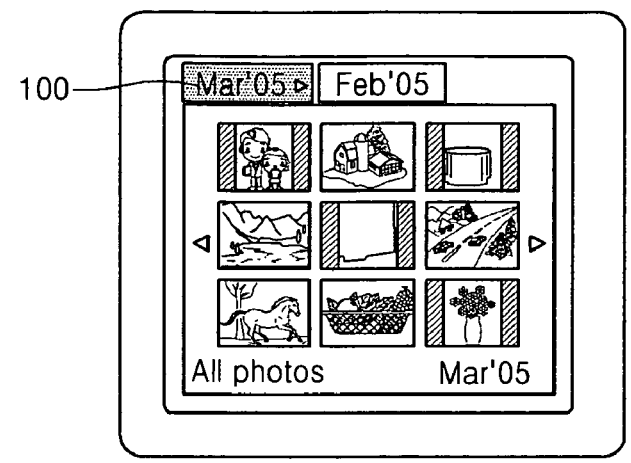
FIGS. 1A, 1B and 1C illustrate a conventional method of retrieving images stored in a storage medium of an image forming apparatus.
Figure 1B:
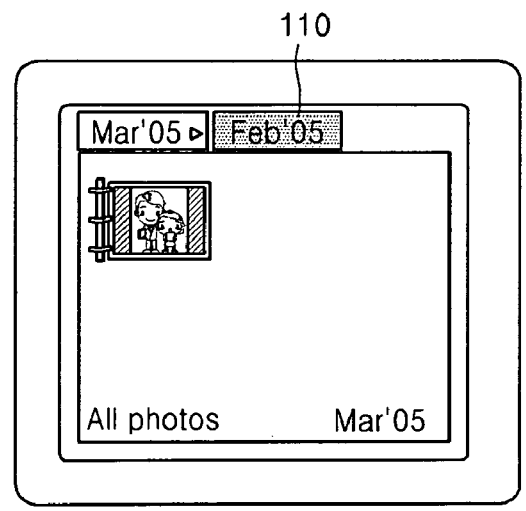
Figure 1C:
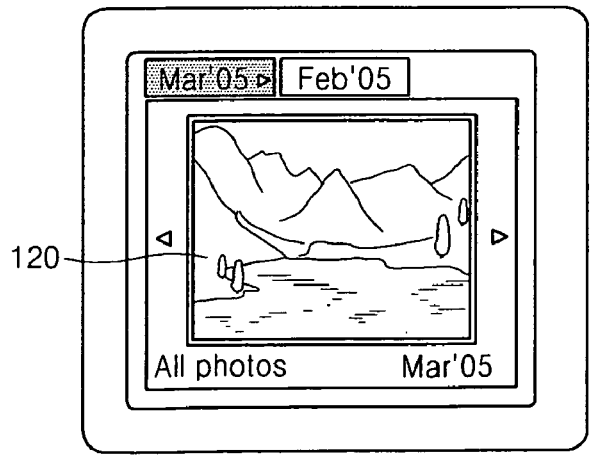
Figure 2:
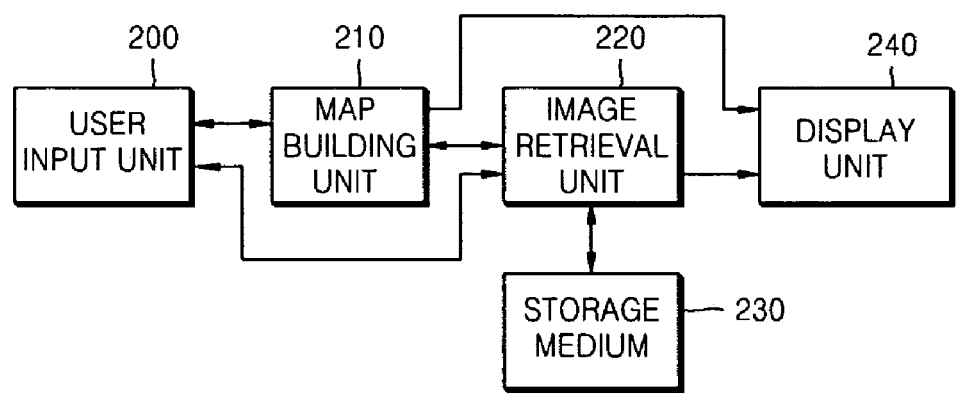
FIG. 2 is a block diagram illustrating a structure of an image management apparatus according to an exemplary embodiment of the present invention.

Exemplary embodiments of the present invention will now be described more fully with reference to the accompanying drawings. FIG. 2 is a block diagram illustrating a structure of an image management apparatus according to an exemplary embodiment of the present invention.

The image management apparatus is comprised of a user input unit 200, a map building unit 210, an image retrieval unit 220, a storage medium 230, and a display unit 240.

Figure 3:
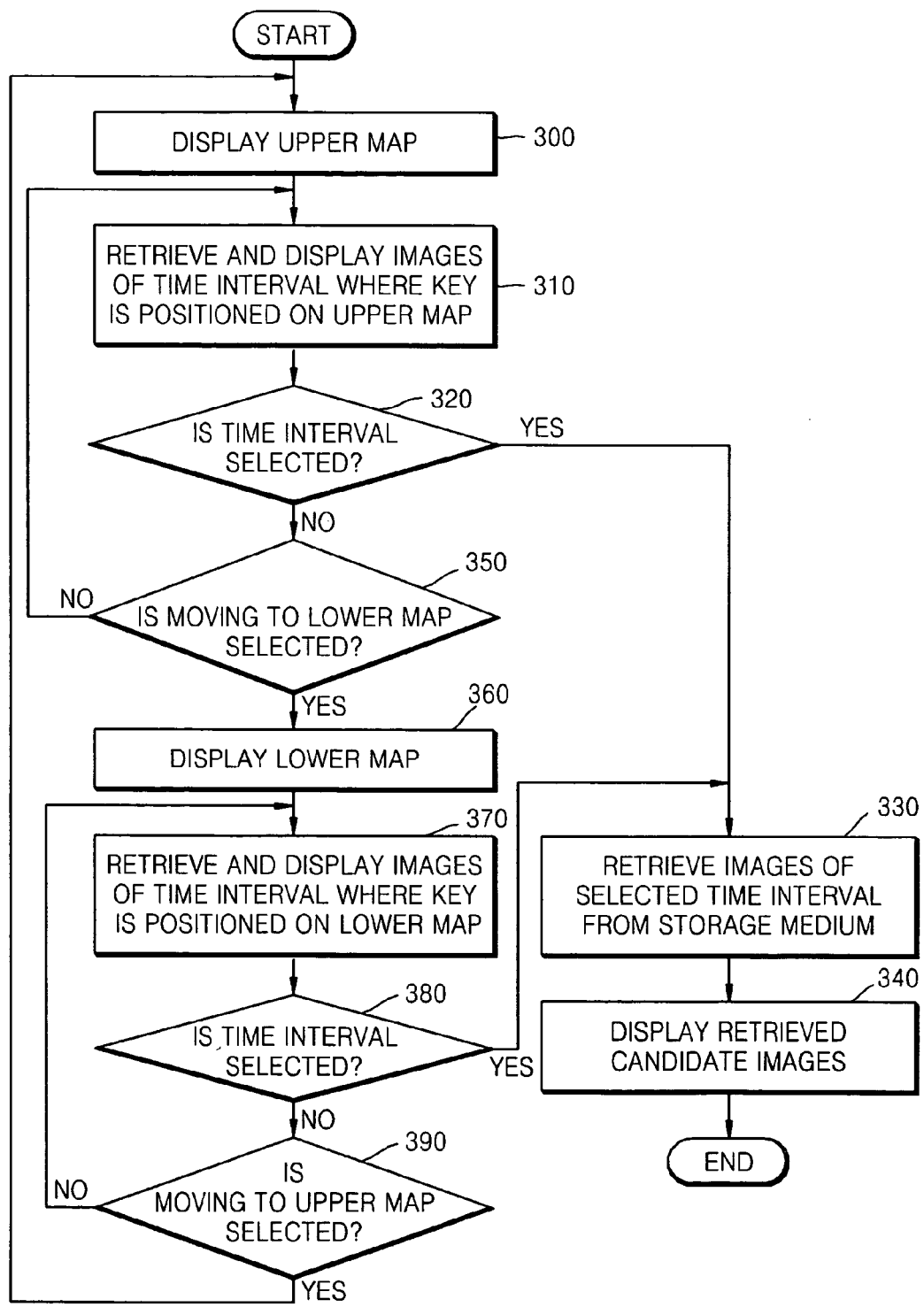
FIG. 3 is a flowchart of an image management method according to an exemplary embodiment of the present invention.

An operation of the image management apparatus illustrated in FIG. 2 will now be explained with reference to a flowchart of an image management method according to an exemplary embodiment of the present invention illustrated in FIG. 3.

The map building unit 210 generates an upper map in which entire time intervals where image files exist are divided into first time units, and the display unit 240 displays the built upper map in step 300.

Figure 5:
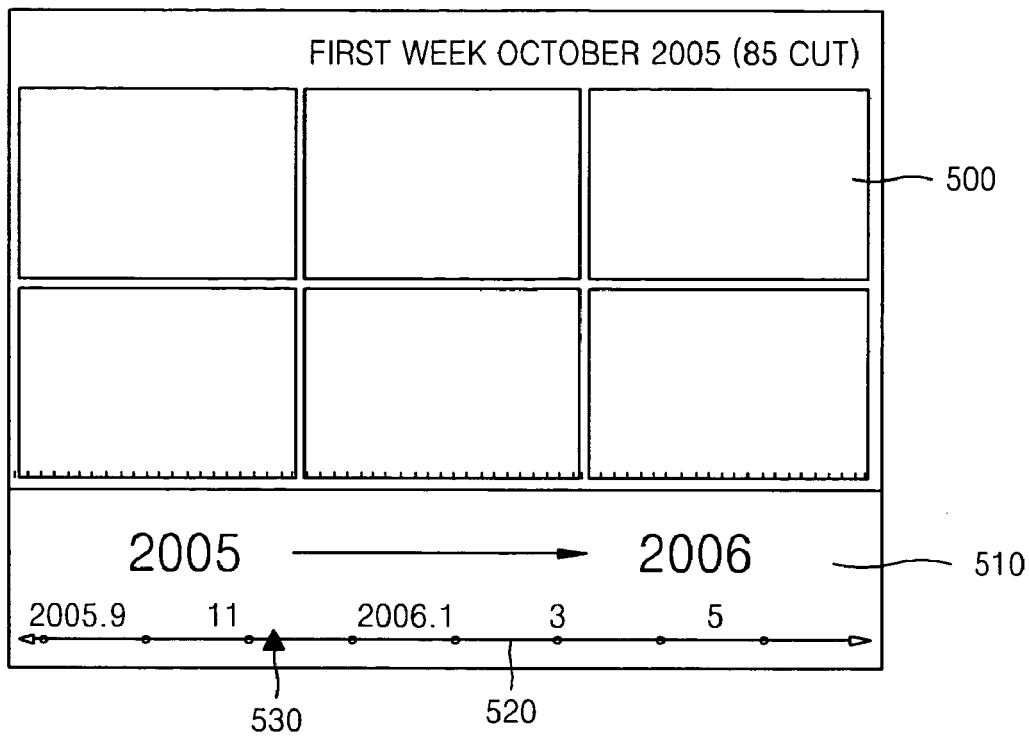
FIG. 5 illustrates an example of an image search window displaying images stored in a storage medium and a time map according to an exemplary embodiment of the present invention.

FIG. 5 illustrates an example of an image search window displaying images stored in a storage medium 230 and a time map according to an exemplary embodiment of the present invention.

In the map area 510 at the bottom of the search window, a time map in the form of a bar is displayed and retrieved images are displayed in a preview area 500 at the top of the search window. In the time map which is in the form of a bar as illustrated in FIG. 5, a time corresponding to each divided time interval is expressed, and a map key 530 that can be moved by a user on the bar 520 is expressed. The map building unit 210 may receive an input from the image retrieval unit 220, of information on a time when each image stored in the storage medium is generated. The map building unit 210 can generate the bar 520 so that a time interval where images do not exist can be distinguished from a time interval where an image exists. For example, the bar corresponding to a time interval where an image exists may be expressed in a deep color or the bar corresponding to a time interval where an image does not exist is expressed in a light color, or the two time intervals may be expressed by different colors, respectively.

The user moves the key on the displayed upper map using the user input unit 200. The image retrieval unit 220 retrieves images corresponding to a time interval where the key is positioned on the upper map, from the storage medium 230 and the display unit 240 displays the retrieved image in step 310.

As the user moves the key, step 310 is repeatedly performed so that displayed images change with respect to the time interval where the user positions the key.

By using meta data of images stored in the storage medium 230, the image retrieval unit 220 may retrieve images generated in the time interval where the key is positioned on the upper map.

The meta data is data that is structured in relation to other data and explains the other data. The meta data is also referred to as property information. The meta data refers to data given to digital content according to a predetermined rule in order to efficiently find and use information desired from a large amount of data. In the meta data, the location and contents of the digital content, information on the author of the digital content, rights and conditions related to the digital content, and usage history are recorded. Generally, in computer-related fields, meta data is used to express data and to quickly find desired data.

The display unit 240 may display thumbnails of the retrieved images. When the number of the retrieved images exceeds the number of images that can be displayed on one screen, the retrieved images are displayed in the order in which they were created. Also, the displayed images may be changed at a predetermined time interval, such as a period of 5 seconds.

Also, the display unit 240 may display representative images first, among the retrieved images.

Once the user confirms the displayed images, the user presses a selection button (not shown) using the user input unit 200 with the key being positioned at the desired time interval to be selected. The selection button is pressed if the user wants to select a time interval to which the retrieved images belong and perform a job, such as printing and deletion of an image, for one or more images belonging to the time interval.

The user input unit 200 confirms whether the user selects a time interval by pressing the selection button in step 320. If the user selects the time interval, the image retrieval unit 220 retrieves the images generated in the selected time interval by using the meta data of the stored images in step 330. The display unit 240 displays the retrieved images in step 340. The user selects any one of the images displayed in oepration 340 using the user input unit and may input a command to perform a predetermined job for the selected image. The selected image to be displayed may be larger than the other images.

In a state in which the upper map is displayed, the user may move to a lower map to facilitate a more detailed retrieval of images by dividing the time interval into smaller time intervals each comprising a smaller time unit than that of the upper map.

The user input unit 200 confirms whether the user selects moving from the upper map to the lower map in step 350.

If the moving to the lower map is selected, the map building unit 210 generates a lower map in which a time interval in which the key is positioned on the upper map is divided into second time units and the divided second time units are displayed. The display unit 240 displays the built lower map in step 360.

On the lower map displayed using the user input unit, the user moves the key and the image retrieval unit 220 retrieves images corresponding to a time interval in which the key is positioned on the lower map, from the storage medium 230. The display unit displays the retrieved images in step 370.

As the user moves the key, step 370 is repeatedly performed such that the displayed images change with respect to the time interval in which the user positions the key.

After the user confirms the images displayed with respect to the lower map, the user selects any one of the time intervals expressed on the lower map using the user input unit 200. The user input unit 200 confirms whether the user selects a time interval on the lower map in step 380. If the user selects a time interval, the image retrieval unit 220 retrieves images generated in the selected time interval by using the meta data of the images stored in the storage medium in step 330. The display unit 240 displays the retrieved images in step 340.

The user can select any one of the images displayed in step 340 using the user input unit 200 and input a command to perform a predetermined job in relation to the selected image.

While the lower map is displayed, the user can move back to the upper map and can perform a rough search in a wider time interval.

The user input unit 200 confirms whether the user selects moving from the lower map to the upper map in step 350 and if the moving to the upper map is selected in step 390, step 300 is performed.

Moving the key on the upper map or lower map may be performed using a left/right direction key included in the user input unit 200. Movement between the upper map and the lower map may be performed using an up/down direction key included in the user input unit 200.

Figure 4:
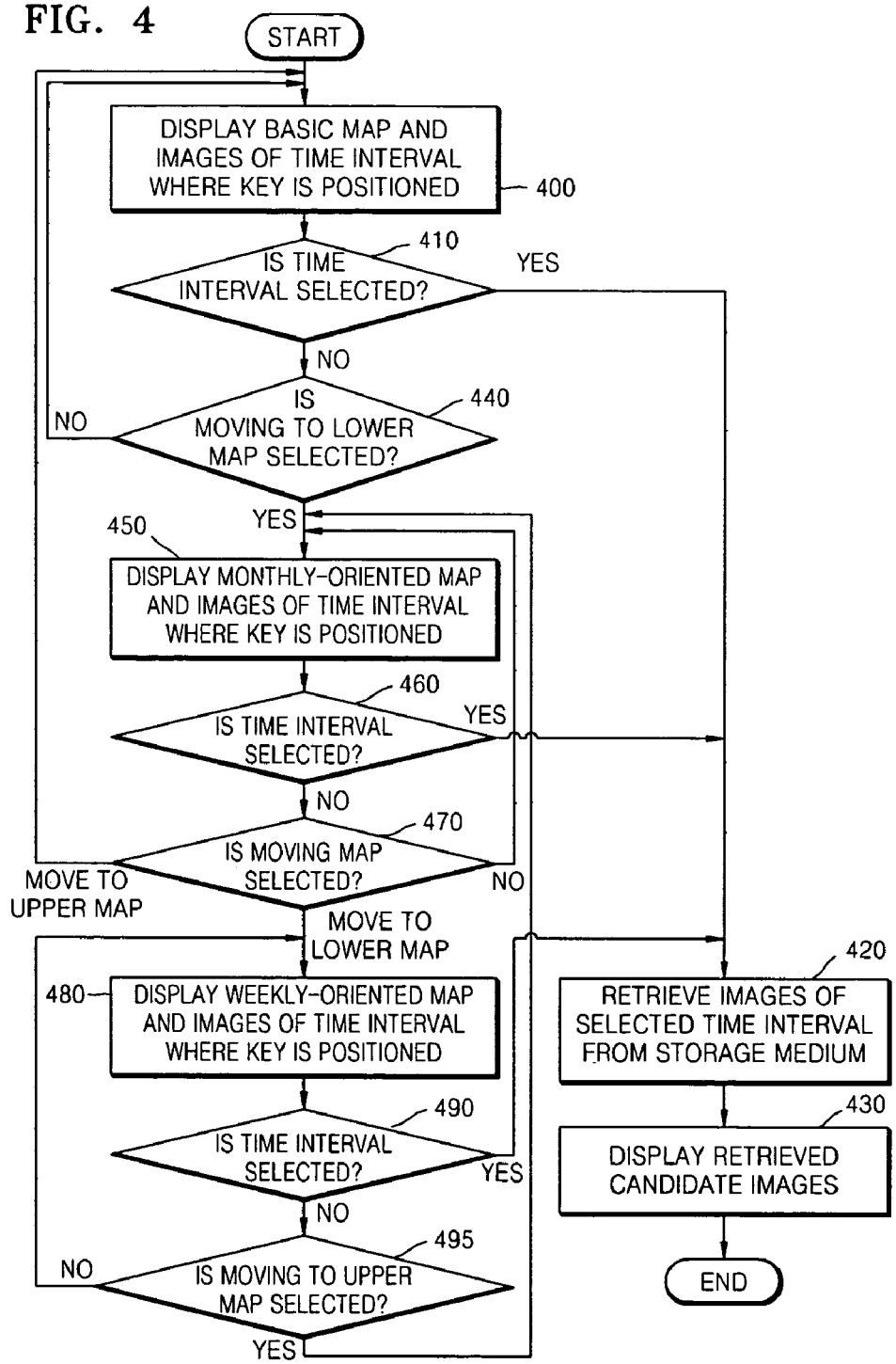
FIG. 4 is a flowchart of an image management method according to another exemplary embodiment of the present invention.

FIG. 4 is a flowchart of an image management method according to another exemplary embodiment of the present invention. The image management method according to an exemplary embodiment of the present invention will now be explained in more detail with reference to FIG. 4 and the block diagram of the structure of the image management apparatus according to an exemplary embodiment of the present invention illustrated in FIG. 2. The image management method according to an exemplary embodiment of the present invention, illustrated in FIG. 4, is a method of managing images by using a 3-stepped map including a basic map, a monthly-oriented map, and a weekly-oriented map.

The display unit 240 displays a basic map including an entire time interval on the map area, and displays images corresponding to a point in time where a key is positioned on the basic map, in the preview area in step 400. The user can roughly confirm images stored in the storage medium 230 using the basic map. After searching the rough images, the user moves to a monthly-oriented map to perform a more detailed search.

The user can move the key positioned on the basic map by using a left/right direction key of the user input unit 200. The displayed images change according to the position where the user positions the key.

The user confirms images displayed together with the basic map, and then, by pressing the selection button of the user input unit 200, the user can select a point in time where a desired image exists. The user input unit 200 confirms whether the user selects a point in time on the basic map in step 410. If the user selects a predetermined point in time, the user input unit 200 is switched to an image selection mode. In the image selection mode, the image retrieval unit 220 retrieves the images generated in the selected point in time by using the meta data of the images stored in the storage medium 230 in step 420, and the display unit 240 displays the retrieved images in step 430. The user selects any one of the displayed images using the user input unit 200, and can input a command to perform a predetermined job in relation to the selected image.

Figure 6:
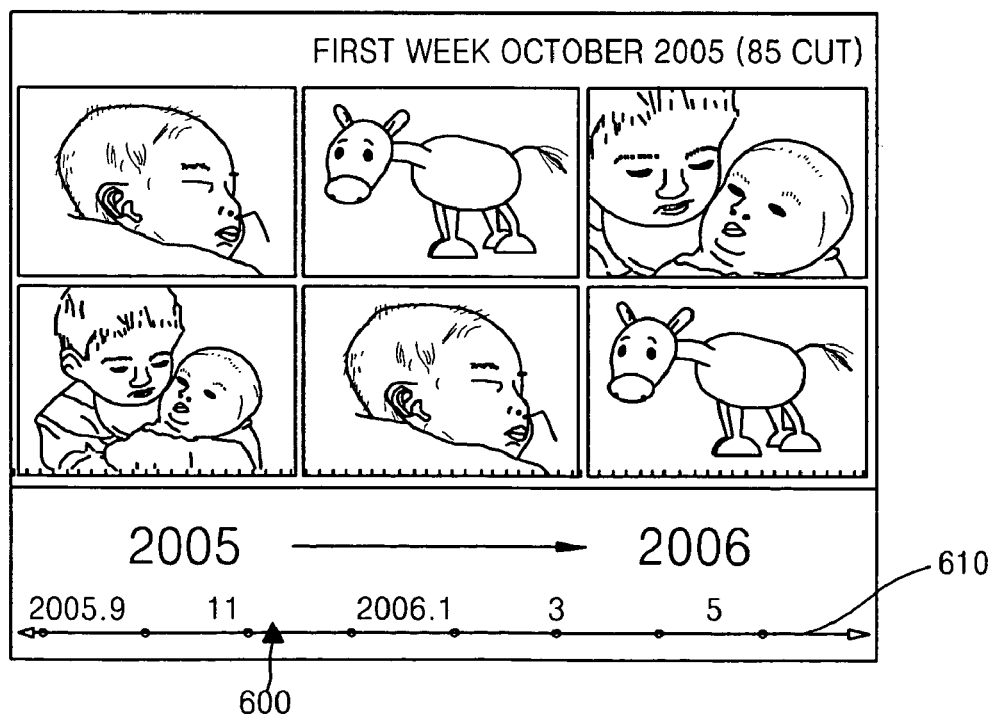
FIG. 6 illustrates an example of a basic map according to an exemplary embodiment of the present invention.

FIG. 6 illustrates an example of the basic map according to an exemplary embodiment of the present invention. In the map area, the basic map 610 in the form of a bar is displayed, and a key 600 that can be moved by the user is displayed on the basic map 610. Images corresponding to the point in time where the key is positioned are displayed in the preview area. By moving the key to the left or to the right, the user can roughly and quickly confirm images generated at each point in time.

Figure 9:
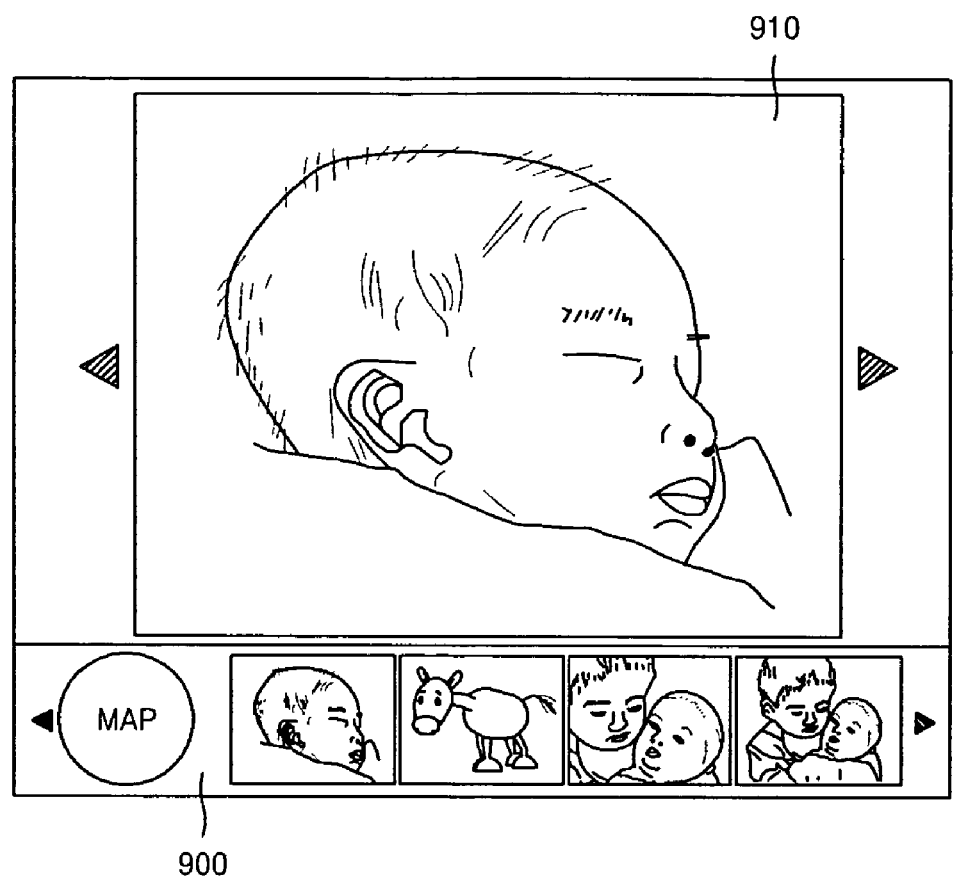
FIG. 9 illustrates an example of displaying a selected image according to an exemplary embodiment of the present invention.

FIG. 9 illustrates an example of displaying an image selected in the image selection mode according to an exemplary embodiment of the present invention. Images of the time interval selected in the map are displayed at the bottom 900 and the image selected by the user from among the images displayed at the bottom 900 is displayed in a larger size at the top 910. The user can select any one of the candidate images displayed at the bottom 900 by using the left/right direction key of the user input unit 200.

After the user roughly retrieves images stored in the storage medium 240 by using the basic map, the user can move to a monthly-oriented map. More specifically, a user can move to a lower map, by selecting a predetermined time interval so that images can be retrieved in more detail. FIG. 6 illustrates an exemplary embodiment of the present invention in which the user can move to a monthly-oriented map, that is, a lower map, by pressing a down direction button of the user input unit 200 while the key 600 is positioned at a desired point in time.

The user input unit 200 confirms whether the user selects moving to a lower map in step 440. If the user selects moving to a lower map, the display unit 240 displays a monthly-oriented map which divides the point in time where the key is positioned on the basic map, into monthly units and displays the monthly units. Then in step 450, the display unit 240 displays images generated in a month where the key is positioned on the monthly-oriented map, in the preview area. For example, if the user selects moving to a lower map while the key is positioned at a point in time around September 2005, the map building unit 210 generates a monthly-oriented map including neighboring months centering around September 2005.

Using the left/right direction key of the user input unit 200 allows the user to move the key on the monthly-oriented map. The displayed images change with respect to the point in time where the user positions the key. The key may be moved to a unit month expressed on the monthly-oriented map according to an input of the user. Also, in the monthly-oriented map a month in which an image does not exist may be expressed distinctively from a month in which an image does exist. When the user moves the key, a time interval corresponding to the month in which an image does not exist may be skipped.

The user confirms displayed images together with the monthly-oriented map. The user may then select a time interval where a desired image exists by pressing a selection button of the user input unit 200. The user input unit 200 confirms whether the user selects any month on the monthly-oriented map in step 460, and if the user selects a predetermined month, the user input unit 200 is switched to the image selection mode, and steps 420 and 430 are performed so that images generated in the selected month are displayed. The user can select any one of the displayed images and input a command to perform a predetermined job, such as printing, in relation to the selected image.

Figure 7:
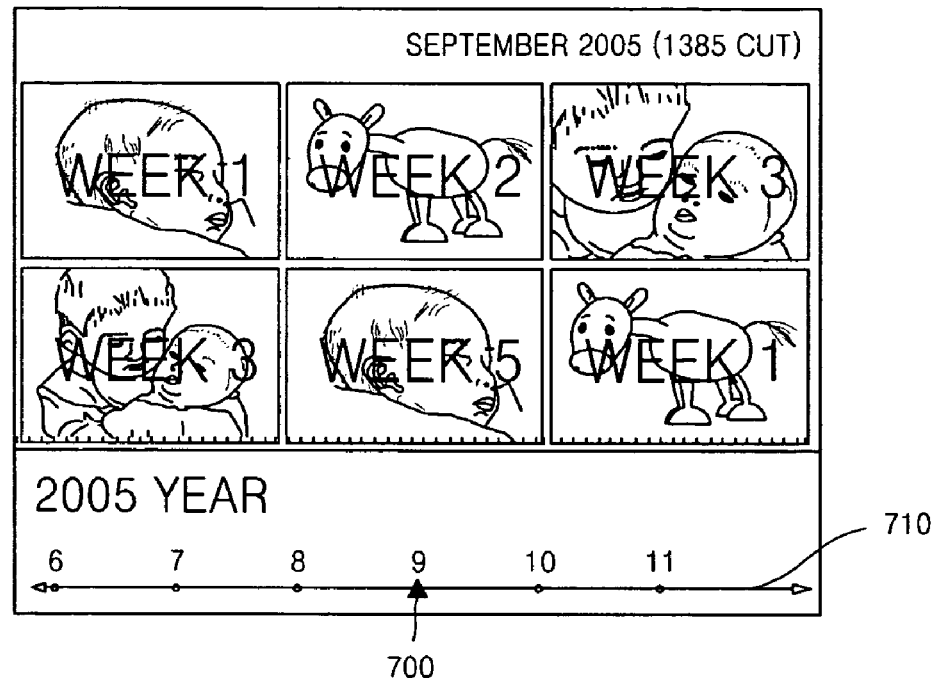
FIG. 7 illustrates an example of a monthly-oriented map according to an exemplary embodiment of the present invention.

FIG. 7 illustrates an example of the monthly-oriented map according to an exemplary embodiment of the present invention. Referring to FIG. 7, the monthly-oriented map 710 in the form of a bar is displayed in the map area, and a key 700 that can be moved by the user is displayed on the monthly-oriented map 710. Images corresponding to a point in time where the key 700 is positioned are displayed in the preview area.

If the user presses the left/right direction button of the user input unit 200, the key 700 moves on the monthly-oriented map by jumping to a next month unit in the pressed direction. For example, as illustrated in FIG. 7, while the key 700 is positioned on September 2005, if the user presses a right direction key once, the key 700 moves to October 2005 adjacent to September 2005 on the right-hand side. As illustrated in FIG. 7, images corresponding to a month in which the key 700 is positioned are divided into weekly units and displayed, and a representative image among images of each week may be displayed. In another exemplary embodiment of the present invention images of each week are displayed and images of the week may be changed in each predetermined period in the order in which the images are created.

The user retrieves images stored in the storage medium 240 by using the monthly-oriented map. Then, in order to retrieve images in more detail, the user can select one month among months expressed on the monthly-oriented map in order to move to a weekly-oriented map, that is, a lower map. In order to retrieve images in a broader range of images, the user can move to the basic map, that is, the upper map. As an exemplary embodiment of the present invention of the map moving method, the user may move to a weekly-oriented map, that is, a lower map, by pressing a down direction button of the user input unit 200, and may move to the basic map, that is, the upper map, by pressing an up direction button.

The user input unit 200 confirms whether the user selects moving to a map in step 440 and if the user selects moving to an upper map, step 400 is performed so that the user can move to the basic map. If the user selects moving to a lower map, the display unit 240 displays a weekly-oriented map which divides a month in which the key is positioned on the monthly-oriented map, into weekly units and displays the weekly units. Then in step 480, the display unit 240 displays images generated in a week in which the key is positioned on the weekly-oriented map, in the preview area.

The user can move the key positioned on the weekly-oriented map by using the left/right direction key of the user input unit 200 so that the key moves on the weekly-oriented map, and the displayed images change with respect to the point in time where the user positions the key. Also, in the weekly-oriented map, a week in which an image does not exist may be expressed distinctively from a week in which an image does exist. When the user moves the key, a time interval corresponding to the week where an image does not exist may be skipped.

The user confirms displayed images together with the weekly-oriented map. Then, the user can select a week in which a desired image does exist by pressing a selection button of the user input unit 200. The user input unit 200 confirms whether the user selects any week on the weekly-oriented map in step 490, and if the user selects a predetermined week, the user input unit 200 is switched to an image selection mode. Then, steps 420 and 430 are performed so that images generated in the selected week are displayed. The user can select any one of the displayed images and input a command to perform a predetermined job, for example, printing, in relation to the selected image. The user input unit 200 confirms whether or not the user selects moving to an upper map in step 495. If the user selects moving to an upper map, the display unit 240 displays a monthly-oriented map which divides the point in time where the key is positioned on the basic map, into monthly units and displays the monthly units.

Figure 8:
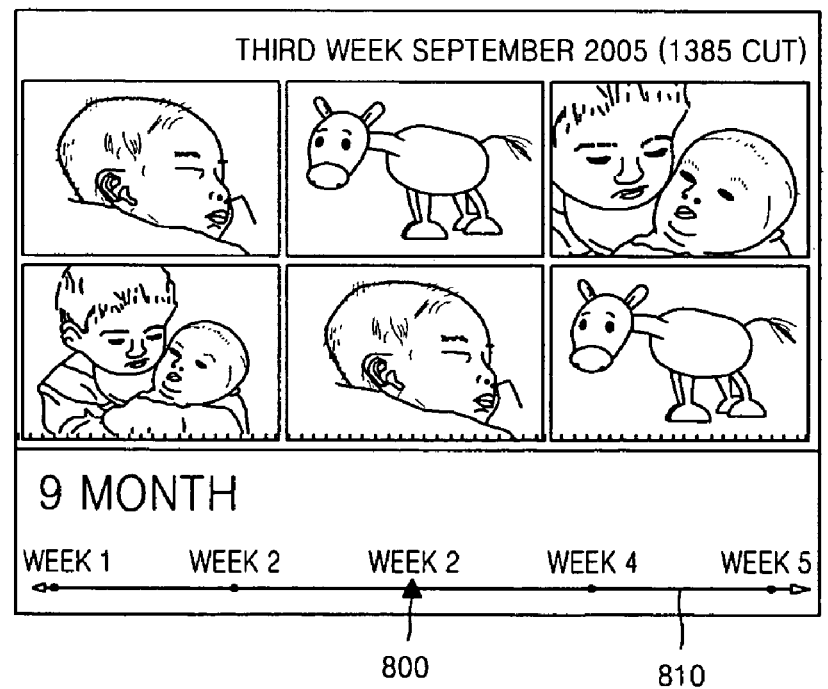
FIG. 8 illustrates an example of a weekly-oriented map according to an exemplary embodiment of the present invention.

FIG. 8 illustrates an example of a weekly-oriented map according to an exemplary embodiment of the present invention. Referring to FIG. 8, the weekly-oriented map 810 in the form of a bar is displayed in the map area, and a key 800 that can be moved by the user is displayed on the weekly-oriented map. Images corresponding to a point in time where the key 800 is positioned are displayed in the preview area.

If the user presses the left/right direction button of the user input unit 200, the key 800 moves on the weekly-oriented map while jumping to a next weekly unit in the pressed direction. If the number of images belonging to a week in which the key 800 is positioned exceeds six, that is, the number of images that can be displayed in the preview area, the display unit 240 may display six images belonging to the week at a time, and change the images in each predetermined period.

The user retrieves images stored in the storage medium 240 by using the weekly-oriented map. Then, in order to retrieve images in a broader time range, the user may move to the monthly-oriented map, that is, the upper map. As an exemplary embodiment of a method of moving to the upper map, the user may move to the monthly-oriented map, that is, the upper map, by pressing an up direction button of the user input unit 200.

Though the exemplary embodiment of the present invention is described above with examples of the method of managing images using three-stepped maps, including the basic map, the monthly-oriented map and the weekly-oriented map, an exemplary embodiment of the present invention may also be implemented using four—or more—stepped maps.

An exemplary embodiment of the present invention may also be represented as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. It is also envisioned that carrier waves (such as data transmission through the Internet) can be utilized as an equivalent to a computer readable medium. The computer readable recording medium can also be distributed over network coupled computer systems so that the computer readable code is stored and executed in a distributed fashion. Also, functional programs, codes, and code segments for accomplishing an exemplary embodiment of the present invention can be easily construed by programmers skilled in the art to which the present invention pertains.

According to the method and apparatus of an exemplary embodiment of the present invention, a plurality of time maps comprising time intervals different from each other are used so that the images can be retrieved to facilitate the management of images stored in a storage medium of an image forming apparatus. Accordingly, a user can retrieve images conveniently and quickly by using a display apparatus with a limited size compared to the number of stored images.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of managing images stored in a storage medium, the method comprising:
    providing an image search window comprising a preview area, an upper map, a lower map, and a map key movable between the upper map and the lower map;
    displaying the upper map with time intervals that are expressed on the upper map and divided into first time units, retrieving images corresponding to a point in time in which the map key is positioned on the upper map, and displaying the retrieved images on the preview area;
    displaying the lower map with time intervals that are expressed on the lower map and divided into second time units, wherein the first time units are different from the second time units, retrieving images corresponding to a point in time in which the map key is positioned on the lower map, and displaying the retrieved images on the preview area; and
    retrieving candidate images corresponding to the input time interval and displaying the retrieved images if a user input for any one of the time intervals expressed on at least one of the upper map and lower map is received,
    wherein at least one of the displaying and retrieving steps are performed by a controller, wherein the map key is used to indicate a specific time interval in relation to one of the upper map and the lower map.

2. The method of claim 1, wherein in the retrieving of the images, images corresponding to the input time interval are retrieved from the storage medium by using meta data of the image files stored in the storage medium.

3. The method of claim 1, wherein in the displaying of the lower map, if an input from the user to move to the lower map is received, the time interval in which the key is positioned on the upper map is divided into second time units, and the divided second time units are displayed.

4. The method of claim 1, wherein in the displaying of the upper map, if an input from the user to move to the upper map is received, the upper map is displayed to comprise a time interval in which the key is positioned on the lower map.

5. The method of claim 1, wherein in the displaying of the images, the thumbnails of the images stored in the storage medium are displayed.

6. A method of managing images stored in a storage medium, the method comprising:
providing an image search window comprising a preview area, a monthly-oriented map, a weekly-oriented map, and a map key movable between the monthly-oriented map and the weekly-oriented map;
displaying the monthly-oriented map with time intervals that are expressed on the monthly-oriented map and divided into monthly units, retrieving images corresponding to a month in which the map key is positioned on the monthly-oriented map, and displaying the retrieved images on the preview area;
displaying the weekly-oriented map with time intervals that are expressed on the weekly-oriented map and divided into weekly units, retrieving images corresponding to a week in which the map key is positioned on the weekly-oriented map, and displaying the retrieved images on the preview area; and
if a user input for any one of the time intervals expressed on at least one of the monthly-oriented map and weekly-oriented map is received, retrieving candidate images corresponding to the input time interval and displaying the retrieved images,
wherein at least one of the displaying and retrieving steps are performed by a controller, and wherein the map key is used to indicate a specific time interval in relation to one of the monthly-oriented map and the weekly-oriented map.

7. The method of claim 6, wherein in the retrieving of the images, images corresponding to the input time interval are retrieved in the storage medium by using meta data of the image files stored in the storage medium.

8. The method of claim 6, wherein in the displaying of images corresponding to the month, representative images of respective weeks belonging to the month are displayed.

9. The method of claim 6, wherein the displaying of the weekly-oriented map comprises:
receiving an input from a user to move to a weekly-oriented map; and
dividing a month in which the key is positioned on the monthly-oriented map, into time intervals of weekly units and displaying the time intervals of weekly units.

10. The method of claim 6, wherein the displaying of the monthly-oriented map comprises:
receiving an input from a user to move to a monthly-oriented map; and
displaying a time interval comprising a week in which the key is positioned on the weekly-oriented map, in the time interval of monthly units.

11. The method of claim 6, wherein in the displaying of the images, the thumbnails of the images stored in the storage medium are displayed.

12. The method of claim 6, wherein the map is displayed so that a time interval in which an image exists is displayed distinctively from a time interval in which an image does not exist.

13. The method of claim 6, wherein in the displaying of the images, the retrieved images are displayed and changed in each period.

14. The method of claim 6, further comprising displaying a basic map in which an entire period of time is divided into time intervals of years and months and the time intervals are displayed, retrieving images corresponding to a point in time in which a key is positioned on the basic map from the storage medium and displaying the retrieved images,
wherein in the displaying of the monthly-oriented map, if an input from the user to move to a monthly-oriented map is received, the monthly-oriented map is displayed to comprise a point in time in which the key is positioned on the basic map.

15. The method of claim 6, further comprising:
receiving an input from the user to select any one of the displayed candidate images;
receiving an input from the user to perform a job in relation to the selected image; and
performing the input job in relation to the selected image.

16. An apparatus for managing images stored in a storage medium, the apparatus comprising:
a map building unit for displaying an upper map expressing time intervals divided into first time units, a lower map expressing time intervals divided into second time units, and a map key movable between the upper map and the lower map, wherein the first time units are different from the second time units;
a user input unit for receiving an input from a user indicating the position of the map key positioned on one of the upper map and the lower map, and receiving an input from the user of any one of the time intervals expressed on one of the upper map and the lower map;
an image retrieval unit for retrieving images corresponding to a time interval in which the map key is positioned on one of the upper map and the lower map, and images corresponding to a time interval input by the user, from the storage medium; and
a display unit for displaying any one of the upper map and the lower map built according to the input of the user and displaying the retrieved images on a preview area,
wherein the map key is used to indicate a specific time interval in relation to one of the upper map and the lower map.

17. The apparatus of claim 16, wherein the first and second time units are a monthly unit and a weekly unit, respectively.

18. The apparatus of claim 16, wherein the image retrieval unit retrieves the images corresponding to the time interval from the storage medium, by using meta data of the image files stored in the storage medium.

19. The apparatus of claim 16, wherein if an input from the user to move to a lower map is received, the map building unit generates the lower map by dividing a time interval in which the key is positioned on the upper map, into time intervals of the second time units.

20. The apparatus of claim 16, wherein if an input from the user to move to an upper map is received, the map building unit generates the upper map to comprise a time interval in which the key is positioned on the lower map.

21. The apparatus of claim 16, wherein the display unit displays the thumbnails of images stored in the storage medium.

22. The apparatus of claim 16, wherein the map building unit generates a map whereby a time interval in which an image exists is displayed distinctively from a time interval in which an image does not exist.

23. The apparatus of claim 16, wherein the display unit displays the retrieved images whereby the retrieved images are displayed and changed in each period.

24. The apparatus of claim 16, wherein the user input unit receives an input from the user to select an image on which a job is to be performed, among the displayed candidate images.

25. An apparatus for managing images stored in a storage medium, the apparatus comprising:

a map building unit for displaying an upper map expressing time intervals divided into first time units, a lower map expressing time intervals divided into second time units, and a map key movable between the upper map and the lower map, wherein the first time units are different from the second time units;

a user input unit for receiving an input from a user indicating the position of the map key on one of the upper map and the lower map, and receiving an input from the user of any one of the time intervals expressed on one of the upper map and the lower map, wherein the user input unit confirms whether the user selects a time interval by pressing a selection button;

an image retrieval unit for retrieving images corresponding to a time interval in which the map key is positioned on one of the upper map and the lower map, and images corresponding to a time interval input by the user, from the storage medium; and a display unit for displaying any one of the upper map and the lower map built according to the input of the user and displaying the retrieved image on a preview area, wherein the map key is used to indicate a specific time interval in relation to one of the upper map and the lower map.

26. The apparatus of claim 25, wherein the first time unit is a monthly unit.

27. The apparatus of claim 25, wherein the second time unit is a weekly unit.

* * * * *